Oct. 20, 1942. W. E. HUMPHREY 2,299,544
PROCESS AND APPARATUS FOR COVERING BALLS
Filed May 9, 1939 5 Sheets-Sheet 1
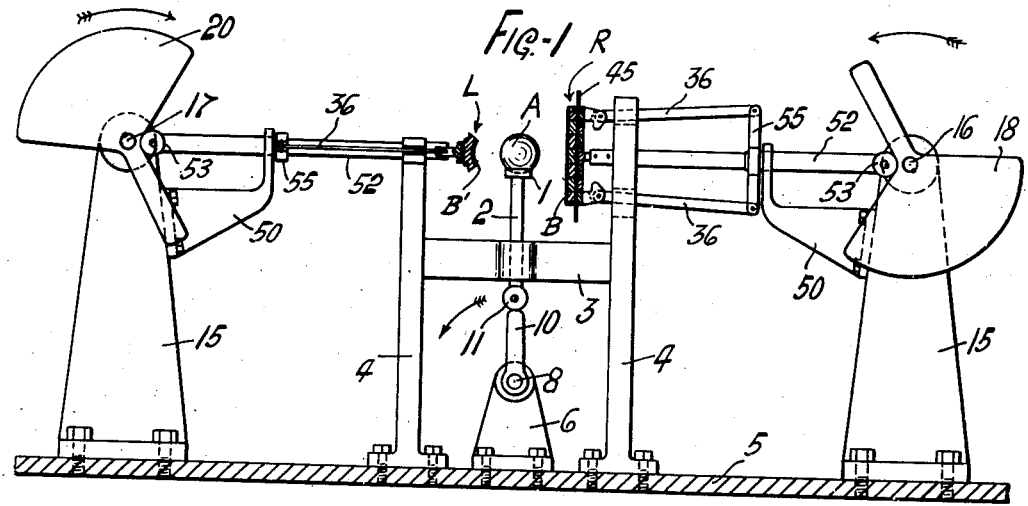
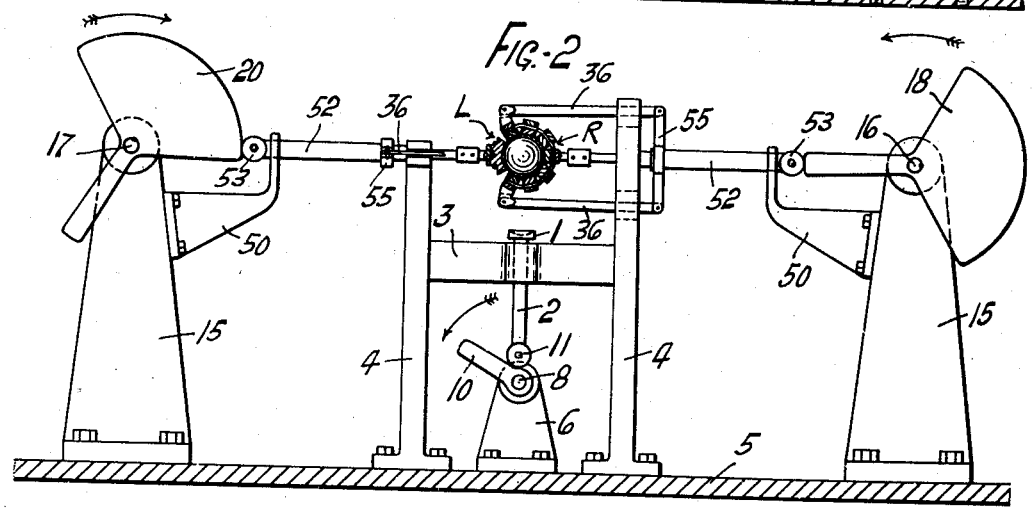
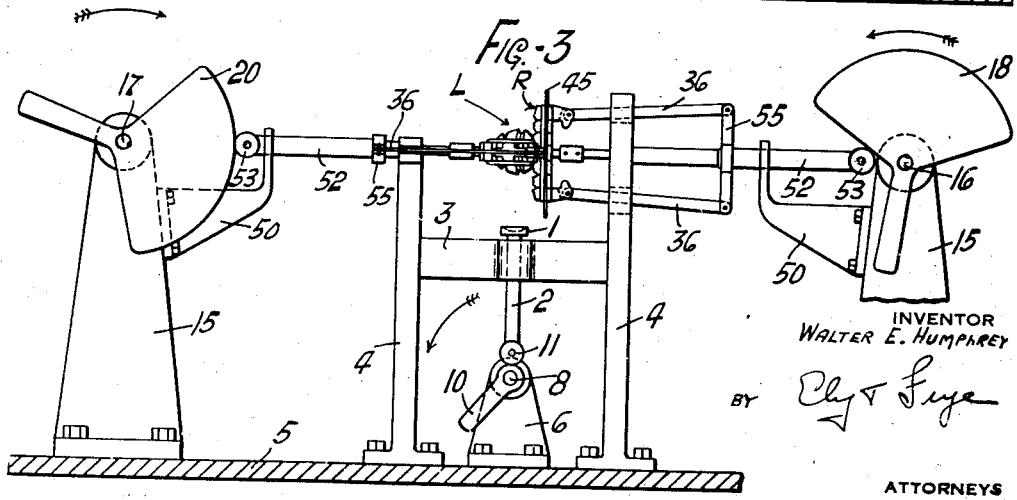
INVENTOR
WALTER E. HUMPHREY
ATTORNEYS Oct. 20, 1942.  W. E. HUMPHREY  2,299,544
PROCESS AND APPARATUS FOR COVERING BALLS
Filed May 9, 1939  5 Sheets-Sheet 2
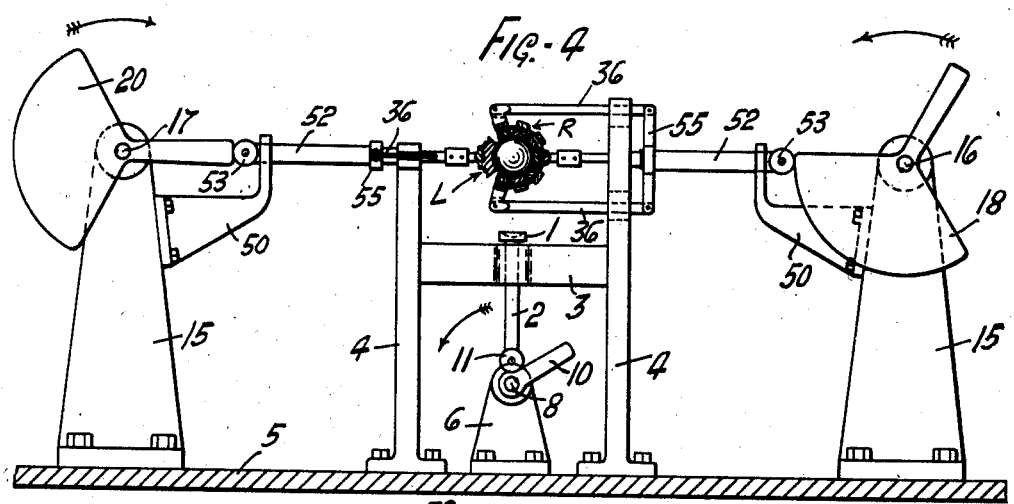
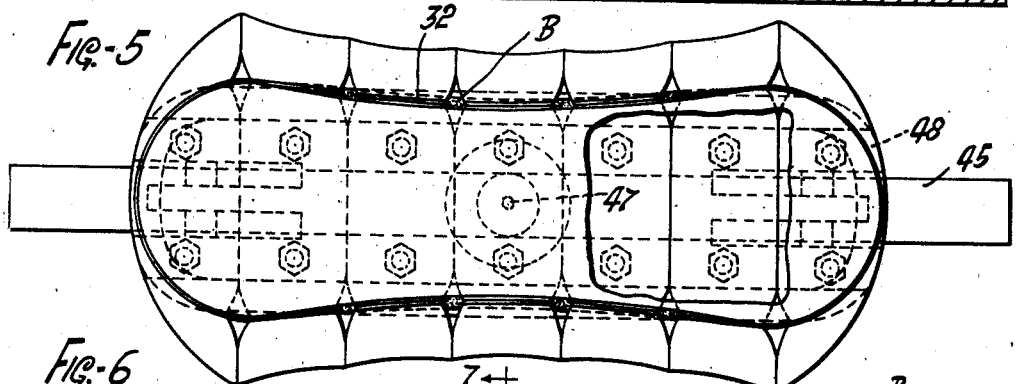
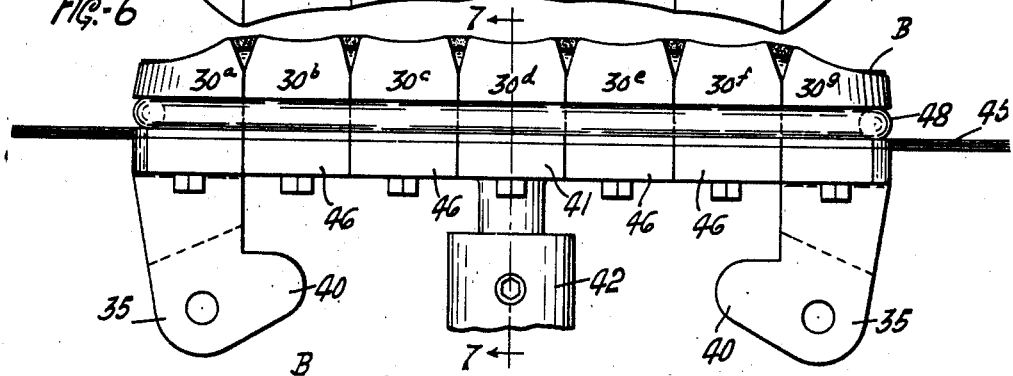
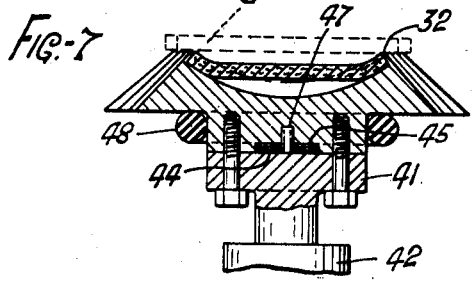
INVENTOR
WALTER E. HUMPHREY
BY
ATTORNEYS Oct. 20, 1942.   W. E. HUMPHREY   2,299,544
PROCESS AND APPARATUS FOR COVERING BALLS
Filed May 9, 1939   5 Sheets-Sheet 3
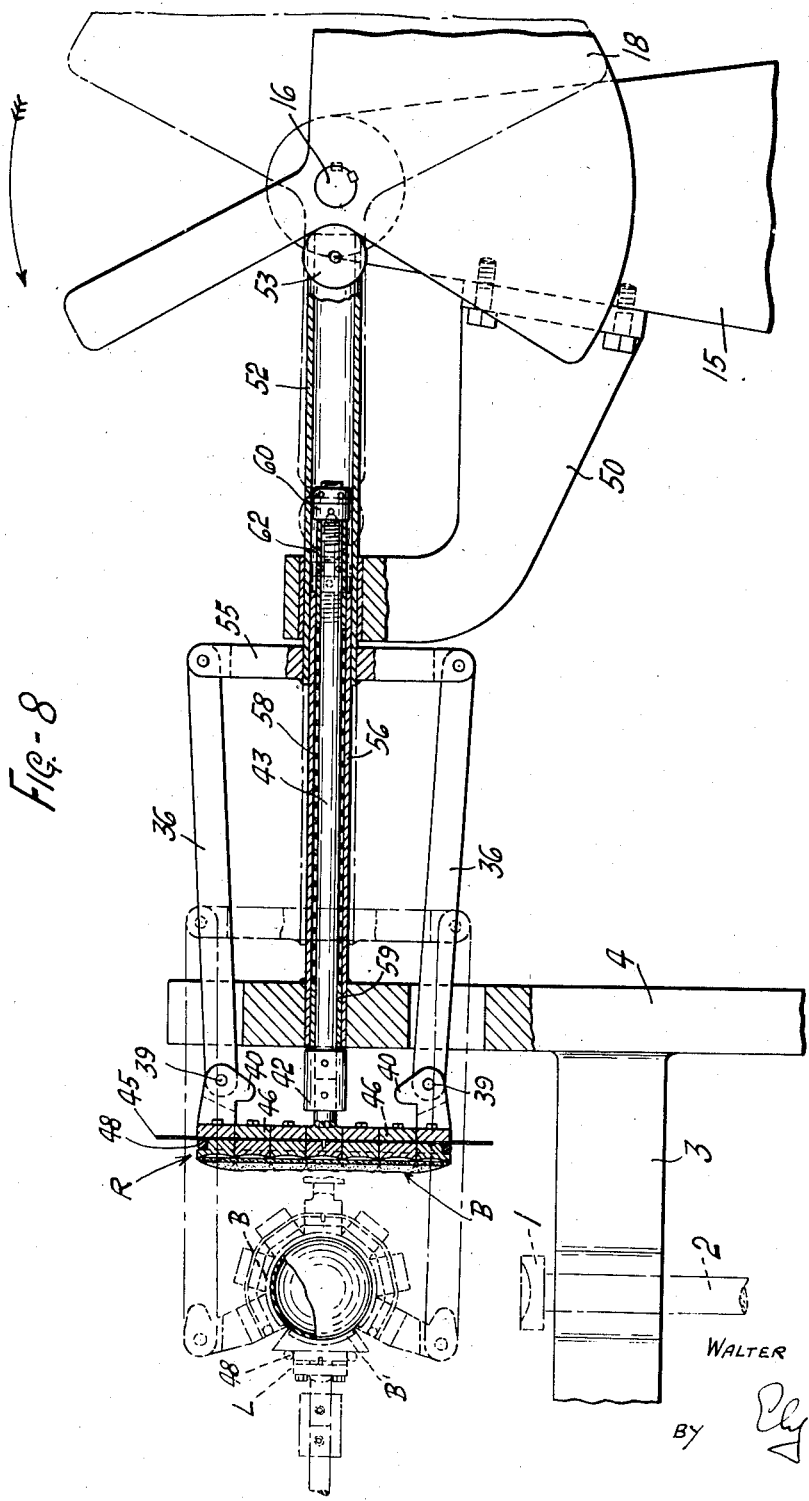
INVENTOR
WALTER E. HUMPHREY
BY
ATTORNEYS Oct. 20, 1942.  W. E. HUMPHREY  2,299,544
PROCESS AND APPARATUS FOR COVERING BALLS
Filed May 9, 1939  5 Sheets-Sheet 4

INVENTOR
WALTER E. HUMPHREY
BY
Ely & Frye
ATTORNEYS

Oct. 20, 1942.  W. E. HUMPHREY  2,299,544
PROCESS AND APPARATUS FOR COVERING BALLS
Filed May 9, 1939  5 Sheets-Sheet 5
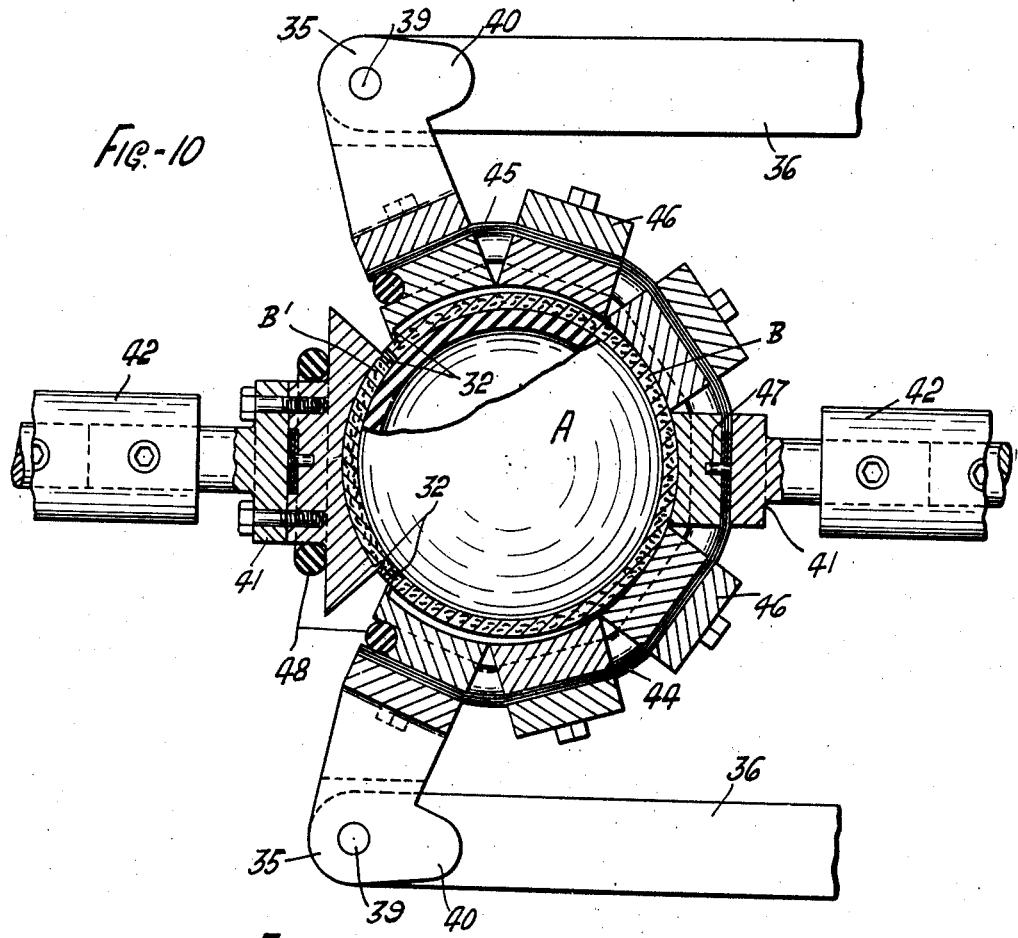
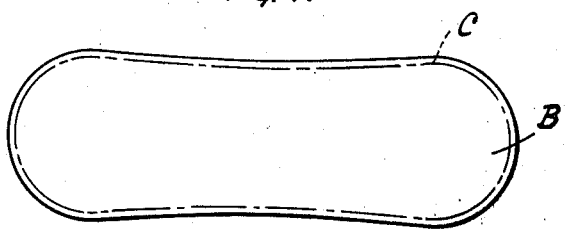
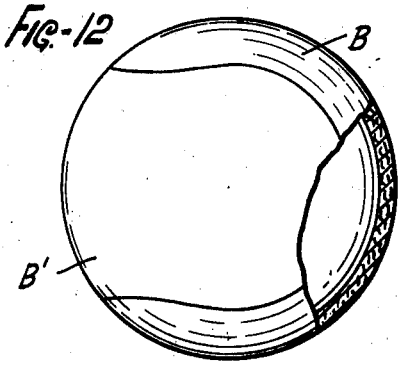
INVENTOR
WALTER E. HUMPHREY
ATTORNEYS Patented Oct. 20, 1942

2,299,544

UNITED STATES PATENT OFFICE 2,299,544

PROCESS AND APPARATUS FOR COVERING BALLS

Walter E. Humphrey, Jeannette, Pa.

Application May 9, 1939, Serial No. 272,614

21 Claims. (Cl. 154—16)

This invention relates to apparatus and methods for applying the outer felt covering to tennis balls or for similar operations. So far as known to applicant no successful machine has ever been devised for performing the peculiar and highly specialized operation of applying tennis ball covering. Machines have been devised for applying one of the sections of the cover only, usually by rolling the adhesively coated ball over a cover piece, which is picked up thereby, but the second interfitting cover piece has been applied by hand. Not only is this an expensive operation requiring considerable skill and practice on the part of the operative, but the mechanical application of one cover piece only has tended to produce an excessive stretching of the piece applied by machine with a corresponding compression of the piece applied by hand, or the reverse. This has given rise to an unevenness in distribution of the felt covering which makes an unbalanced ball. This condition is aggravated by the subsequent final curing operation which is performed after the cover is applied and for the purpose of "setting up" the rubber cement which is employed as the adhesive, as the cover section will shrink unevenly forming large cracks in the ball cover.

There are other disadvantages to the known practices which this invention has eliminated. It makes possible covering a ball by a full series of mechanical operations, the application of both cover sections being performed through the operation of mechanical means which carry the two sections of the cover which are in the usual and standard shapes common to all types of ball coverings. The cover pieces are wrapped about the ball by the movement of flexible applicators, which I have designated here as "hands," the pieces being applied simultaneously so that they adhere to the ball center or core.

After the pieces are applied, the hands are withdrawn and returned to the ball so that they tamp the cover pieces in place, smoothing out any irregularities and firmly attaching the edges of the pieces in places where they may have been freed by the withdrawal of the hand in the initial application. The hand is so constructed and designed that in the tamping operation it will not only smooth the body and edges of the cover pieces on the ball, but will force the edges together and thus reduce the cracks or gaps found between the cover pieces in balls covered by former methods.

An especial advantage of the invention lies in the fact that the hands or applicators are so constructed that they are somewhat less in area than the cover pieces in free and normal condition and having a surrounding ridge or edge portion, the covers are compressed while in the hands, but as both hands are identical in area the compression is not only uniform in each cover piece, but the compression or condensation is equally distributed between the two cover pieces. This is an important element of the invention for it secures a completely balanced ball due to the equal distribution of the felt of the cover by the mechanical applicators or hands.

For the reasons stated above the ball covered by the method and apparatus outlined above is different in physical characteristics and appearance from tennis balls made by hand or other prior methods, being a perfectly balanced ball, a result not heretofore accomplished.

The apparatus and process contribute to substantial savings in manufacture of tennis balls as no process or apparatus has heretofore been known which will complete the application of the entire cover mechanically.

In the present application the covering unit only is shown, it being possible to load the applicators with the cover pieces by hand. In commercial embodiments of the machines, the pieces of felt may be placed in the "hands" by automatic machinery operating as adjuncts or additions to the structure here shown. Such automatic loaders are the subject of a further application Serial No. 295,300, filed September 16, 1939, Patent No. 2,279,921, granted April 14, 1942.

For the purpose of illustrating the basic and novel elements of the invention, simple cam mechanisms are shown to propel the applicators to and from the ball and to support the ball in position until the applicators seize the ball. In commercial installations other motive forces may be applied which may be substituted for the particular devices shown herein.

It will further be understood that other changes and modifications may be employed in adapting and perfecting the basic conceptions here disclosed. Also the operation of the various elements may be timed to coordinate with a loading machine for the covers and for positioning the ball.

The "hands" or applicators and their successive operations are subject to modification but the form shown herein is the best known and preferred form of the invention.

In the several views in which this invention is shown,

Figure 1 is a side elevation of a simple form of machine wherein the hands or applicators are withdrawn in position to receive the cover sections and in which the ball is shown in position upon its temporary support;

Figure 2 is a similar view showing the hands enveloping the ball as in the first operation of applying the cover, the hands being shown in section, and the ball support removed;

Figure 3 is a view similar to Fig. 2 showing the hands in side elevation but with the right hand at the beginning of its tamping operation;

Figure 4 is a view similar to Fig. 2 but showing the tamping operation by the left hand;

Figure 5 is a plan view of the hand enlarged to show the formation of its several parts and their method of articulation;

Figure 6 is a side view of the hand;

Figure 7 is a cross section of the hand on the line 7—7 of Fig. 6, showing the manner in which the felt cover piece is crowded or compressed so as to secure the even distribution of the material;

Figure 8 is an enlarged detail view of an operating unit for supporting and moving a hand, the full line position showing the hand as it is withdrawn and the dotted line showing the position of the hand as it envelops the ball;

Figure 10 is a similar view showing the tamping operation, particularly illustrating the manner in which the hand accomplishes the crowding together of the edges of the two cover pieces;

Figure 11 is a view of a section of the cover illustrating by dotted lines the amount which it is compressed by insertion in the hand; and Figure 12 is a view of the covered ball.

Figure 9:
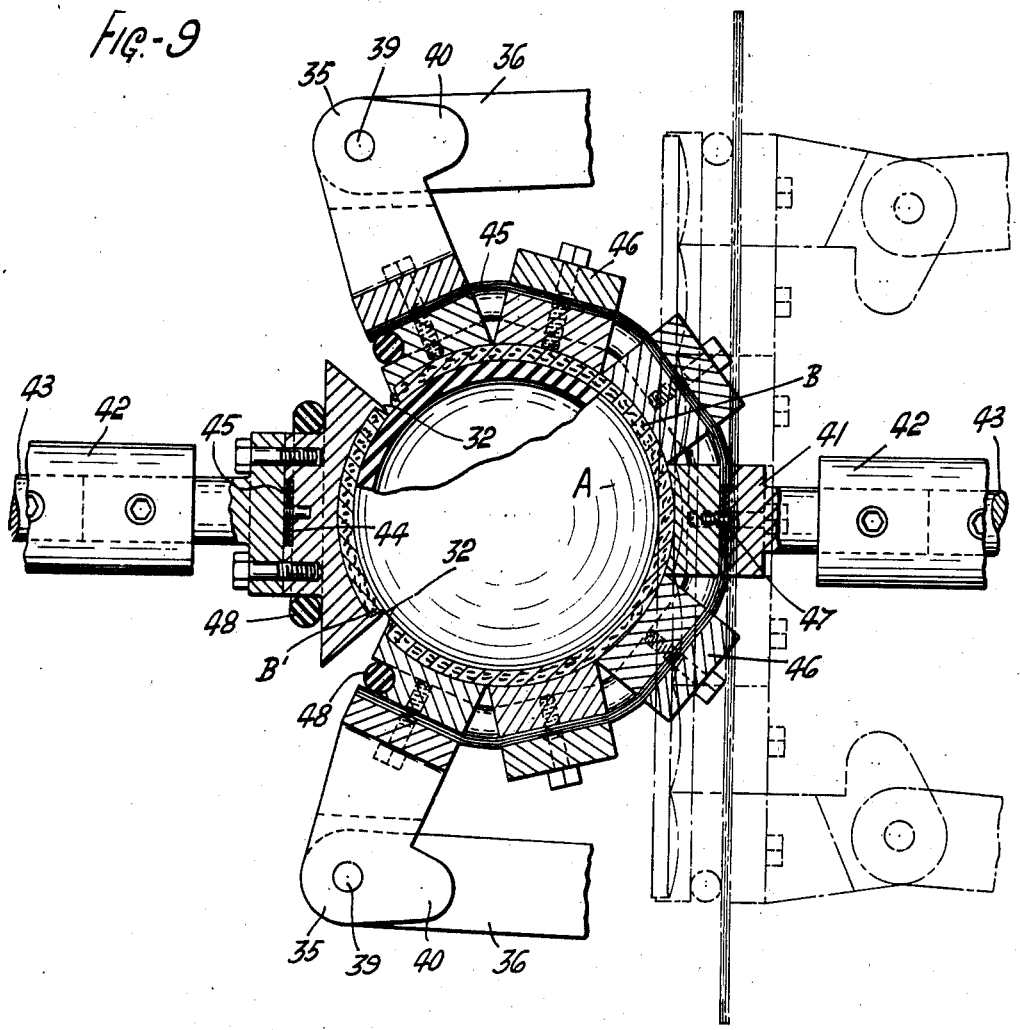
Figure 9 is an enlarged cross sectional detail of the hand in the application position in full lines and withdrawn position in dotted lines.

In the manufacture of tennis balls it is the practice to form and vulcanize a spherical center or core of rubber containing air under pressure. The core is substantially cured before the covering operation and is illustrated at A. It is then coated with an adhesive cement usually of a vulcanizable rubber composition which is sticky and will retain the cover sections in position. These two cover sections are shown at B and B' each being in the usual 8-shape and made of a felt or like material which is compressible. When these sections are applied to the ball in the proper manner they will adhere thereto and the application is completed by heating sufficiently to cure or set up the cement. The heat of this finishing operation will tend to shrink the cover somewhat which is one of the reasons for making the covers larger than in the finished ball.

As noted heretofore, the process and apparatus are designed to give a uniform compression or condensation to the cover pieces. This has been illustrated in Fig. 11 in which the dotted outline C uniformly spaced about the periphery of the cover pieces, shows the outline of the edge or border of the hand. The cover when placed within the hand is contracted to the extent indicated by this outline.

Referring particularly to the description of the apparatus:

The ball core A is placed in position on a temporary support or holder 1 which may be a ring or dished plate carried on the upper end of a plunger 2 mounted in the cross member 3 of a frame, the vertical members 4 of which form the supports and guides for the hands. The frame is attached to a base 5 on which is located the standard 6 having the rotating shaft 8 therein which carries a cam 10 supporting the roller 11 at the lower end of the plunger 2. The shaft 8 is rotated through a single revolution to rise in position after the covering of one ball to receive a new core and then to retreat just as the hands grip the ball. The hands support the ball until after the completion of the tamping operations, when they separate, dropping the covered ball in a chute or container (not shown).

Upon the base 5 in either side of the ball support are two standards 15 which support the operating shafts 16 and 17 for the right and left hand applicators or hands. To the shaft 16 is attached the operating cam 18 for the right hand R and to the shaft 17 the operating cam 20 for the left hand L. It will be observed that while these cams are similar, they are differently positioned upon their respective shafts to secure the correct timing of the hand movements. As shown in Fig. 1 both hands are withdrawn before the covering operation. In Fig. 2 both hands have advanced to apply the cover selections, but cam 18 has a very short forward dwell, whereupon it withdraws the right hand while the left hand remains in contact with the ball and grips it until the right hand has returned for its tamping operation. This position is shown in Fig. 3. The right hand now stays forward and holds the ball while the left hand is withdrawn and returned for its tamping operation, as shown in Fig. 4. Then both hands withdraw to release the covered ball.

It will be noted that the two hands R and L are placed at right angles, the hand R being shown as vertical and hand L as horizontal. This is so that when both hands are around the ball it will be completely surrounded, the hand R wrapping about the ball in a vertical plane and the hand L in a mating horizontal plane.

With the exception of the positioning of the hands, they are identical and a description of one will suffice.

Each hand is jointed, being made up of articulated sections the number of which may be optional. In the preferred form of the invention a hand is formed of seven sections numbered from left to right as 30a to g, inclusive. The inner surface of each section corresponds to a segment or portion of the entire spherical surface so that when the fourteen sections, seven in each hand, envelop the ball they fit its outer surface perfectly and compress the cover on the surface of the ball. When in the condition shown in Figs. 5 and 6, these sections lie in a substantial plane ready to receive the cover piece.

Each section is provided with a sharp ridge or border 32 raised above main curved surface which serves to hold the cover piece in position. The ridge is as thin as may be practicable so as to allow for the closest possible approach of the segments when the hands are brought together and constitutes a pocket to receive and hold the cover piece.

The end sections 30a and 30g are each provided with an angular lug 35 to which the operating levers 36 are attached, the ends of the lugs being forked to receive the levers to which they are attached by pivots 39. Projecting ears 40 are formed on the lugs which bear on either side of the levers 36 during the enfolding movement of the hand as shown in dotted lines in Fig. 8, and this keeps the hand sections in alignment throughout the entire operation.

The central section of the hand 30d is secured to a plate 41 which is attached to the main operating spindle 43 by collar 42. On the underside of the section 30d and lying in a groove 44 formed therein, is a flexible leaf spring 45 which extends on either side thereof beneath the several sections, being received in corresponding grooves therein and held by plates 46. The spring is pinned to the section 30d as at 47. The remaining sections of the hand are slidable along the spring. Surrounding all of the hand sections is a heavy elastic band 48 which holds the hand sections together but permits them to separate at their outer surfaces during the enfolding and applying or tamping operations. The spring 45 permits this movement but returns the hand sections to the flat condition as the flexing forces are relieved.

As shown in Fig. 11 and also in the dotted lines in Fig. 7 the cover piece B is somewhat larger than the area enclosed by the upstanding ridge 32, and the cover piece is therefore compressed when forced into the pocket on the face of the hand. Loading may be done by hand, or by appropriate machinery which has been suggested. The full line showing in Fig. 7 illustrates the manner in which the cover piece reacts under the compressive forces. It tends to chord across the hollow of the hand, but can be pressed into close contact with the surface of the hand, the position of the cover piece before the enfolding operation being shown in dot and dash lines in Fig. 7.

Referring now to the mechanism for moving and flexing the hands to and from the ball. On each of standards 15 is provided a bracket 50 in which is slidably received the tubular plunger 52 having a roller 53 bearing upon its respective cam 18 or 20. To the outer end of the plunger is secured a cross piece 55 in the ends of which are pivoted the hand operating levers 36 previously mentioned. Within the tubular plunger 52 is a second tubular guide 56 the forward end of which is fixed in the upper end of the upright 4 and in this latter guide is received the plunger or spindle 43 carrying the hand section 30d. A heavy coil spring 58 surrounds the spindle 43 and bears against a collar 59 at the outer end of the guide 56. The end of the spindle remote from the hand is screw-threaded to receive the adjustable abutments 60 against which is located the spacer sleeve 62 which receives the thrust of the coil spring 58. As the hand is moved forward the spring 58 will be compressed which will restore the hand to its initial position when the cam completes its forward stroke.

The hand actuating device is operated as follows:

As the high part of the cam passes beneath the roller 53 the tubular plunger 52 is advanced carrying the levers 36 which move the hand bodily forward compressing the spring 58. The hand moves forward in flat condition until the adjustable abutments 60 strike the end of the guide 56, which should be at the instant or immediately after the cover piece is brought in contact with the ball, at which time the section 30d only will touch. A slight advance beyond the point of contact may be desirable to press the cover pieces firmly against the adhesive ball surface. Both hands will reach the ball at the same instant so that it will not move from its central position. The ball rest will drop out of position immediately after this point is reached.

The continued forward movement of the plunger 52 is then translated into an enfolding or flexing movement of the hand and as the section 30d is now stationary the hand will wrap about the ball on either side thereof. The force being applied to the extremities of the train of hand sections will cause a progressive bending of the hand until a full envelopment of the ball is attained, as shown in Fig. 9, the leaf spring 45 and the elastic band 48 permitting such movement, the several hand sections sliding over the spring and the band keeping the sections in edge-to-edge contact with each other at the face and then restoring the hand to its flattened condition as the levers 36 are withdrawn.

The conditions illustrated in Fig. 9 are at this stage of application of each cover piece, it being apparent that at this point the cover pieces in compressed condition lie within the ridge 32 and that there is a gap between the edges of the cover pieces. As has been described, the hands are withdrawn in successive steps to accomplish the tamping action. As the hands are withdrawn the cover piece is retained on the ball core A but the withdrawal causes the edges of the cover to be pulled away from the core at points due to the fact that the ridge about the hand sections tends to pull the cover away. When the hands return, however, for the tamping operation the ridge about the hand will dig into the cover, smooth out the loose spots and crowd the edges of the cover together. This action is attempted to be shown in Fig. 10 where the right hand is shown digging into the cover piece and the left hand is shown fully pressed against the ball. It will be appreciated that the operation of the machine could be stopped after the application of the cover pieces and the smoothing done by hand.

The combination of steps of compressing both cover pieces within the confines of the hands and the tamping operation described not only distributes the fullness of the cover pieces uniformly over the ball but closes up the objectionable gap between the edges of the pieces more effectively than any previous method of ball covering.

The adjustment of the stop 60 which limits the forward bodily movement of the hand permits accurate spacing of the hands when they seize the ball so as to compensate for variations in the size of the ball centers, thickness of the covering pieces and other variable factors.

At the conclusion of both tamping operations the hands withdraw and the parts are restored to their original position by the springs in the hand, the elastic band and the spring 58. The ball is released completely covered and is ready for the setting up cure for the rubber cement.

It will be appreciated that the details of the hands, the number of sections and the flexible mounting thereof have been described in detail for these parts as shown have been found to operate successfully and represent the best known form of the invention. However, changes and modifications may be resorted to without departing from the essential features of the invention or sacrificing any of its benefits.

It will be apparent also that the operating mechanism is shown as exemplary merely. In commercial operations it will be advisable to equip the machine with a timing device so that the ball rest and hands will function in exact time relation. These devices may be supplied to accommodate the needs of a particular machine and do not affect the basic principles of the invention.

By having the hand flattened out when the cover piece is inserted, as in the form of the invention shown, the operation of loading the hand is simplified and it is possible to perfect automatic loading devices which will replace manual loading and which will compress the cover pieces and place them in position within the pocket on the hand.

As the machine and process are believed to represent the first operative full mechanical covering of tennis balls, the claims herein are entitled to a substantial range of equivalents and details may be altered and modifications adopted. The machine and process which is described and claimed herein is especially desirable for applying cover pieces which are provided with cemented edges as is the current practice in the art. This is due to the fact that the applicators or "hands" are of the full size and shape of a complete cover piece. The tamping operation also contributes materially to the effective application of cover pieces with cemented edges.

It will also be understood that while the invention is specifically designed to cover tennis balls the principles thereof may be incorporated in machines for covering other balls. Where the term "tennis balls" is used in the specification or claims it will be understood that the covering of other balls is not excluded.

It is not essential to the use of some of the basic principles disclosed that the tamping operation be performed on this machine, but that operation improves the product so materially that it is preferred.

What is claimed is:

1. A process for the covering of tennis balls comprising uniformly compressing a cover piece only in directions parallel to its major surfaces, and applying the cover piece to a ball core while the cover piece is maintained in such compressed condition.

2. A process for the covering of tennis balls comprising the steps of crowding two cover pieces within equal areas each being less than the normal area of a cover piece, and wrapping the pieces about a ball core while maintaining the uniform compression of the pieces.

3. A process for the covering of tennis balls, comprising the steps of condensing the area of two cover pieces uniformly and equally, maintaining the cover pieces in condensed condition until they are initially applied about a cemented ball core and, before the cement is set, crowding the edges of the covers together.

4. A process for the covering of tennis balls comprising the steps of condensing the area of two cover pieces uniformly, maintaining the cover pieces in condensed condition while applying them simultaneously to a cemented ball core, and then crowding the edge portions of the cover pieces together by application of forces tending to expand the cover pieces to narrow the space between the edges of the cover pieces.

5. A process for the covering of tennis balls comprising the steps of condensing the area of two cover pieces uniformly, maintaining the cover pieces in condensed condition while applying them simultaneously to a cemented ball core, and then crowding the edge portions of the cover pieces together by application of forces to the two cover pieces in succession tending to expand the cover pieces to narrow the space between the edges of the cover pieces.

6. A machine for the covering of ball cores comprising a core support, a pair of jointed applicators on opposite sides of the support each having means to hold a cover piece and means to move the applicators against the ball core and bend them so that they envelop the ball core.

7. In a machine for the covering of ball cores, a pair of flexible articulated hands each composed of sections which together comprise an area approximating a single cover piece, means to advance the hands simultaneously from opposite sides of the core and to flex the hands so that they envelop the core.

8. In a machine for the covering of ball cores, a pair of flexible articulated hands each composed of sections which together comprise an area approximating a single cover piece, means to advance the hands simultaneously from opposite sides of the core, to flex the hands so that they envelop the core, and to withdraw and return the hands successively to the core to complete the attachment of the cover pieces.

9. A machine for covering balls, having a flexible articulated hand, means to hold the hand in flattened condition to receive a cover piece and then to advance the hand against the ball and flex it to envelop the ball.

10. A machine for covering balls comprising a flexible articulated hand, said hand being composed of a plurality of sections, means to hold the sections together but to permit their relative movement from a substantially flat condition to curved condition about a ball core.

11. A machine for covering balls comprising sections forming an applicator of the shape of a cover piece, and means to hold the sections together but to permit the applicator to flex to a position to envelop a ball core.

12. A machine for covering balls comprising a plurality of segments forming a hand of the shape of a cover piece, said segments having ridge formations surrounding the hand and constituting a pocket to receive a cover piece.

13. A machine for covering balls comprising a plurality of segments forming a hand of the shape of a cover piece, said segments having ridge formations surrounding the hand and constituting a pocket to receive a cover piece, said pocket being of less area than the normal area of a cover piece.

14. A machine for covering balls comprising a core support, two applicator members on opposite sides of the support, each applicator having a recess to receive a preformed planar blank of Cassinian outline, means to bring the core into contact with the applicators and means to withdraw the core support after the applicator members contact the core.

15. In a machine for covering balls, the combination of two flexible applicator members facing each other, said members having means to hold cover pieces until they are brought into contact with the core, and means to bring the applicator members together simultaneously against a ball core and to wrap them about the core, and then to withdraw and return the applicators successively to tamp the cover pieces in place.

16. A machine for covering balls having in combination two flexible applicator members facing each other, each member having peripheral flanges constituting a pocket to receive a cover piece, means to bring the applicator members together against a ball core, and to wrap them about the core simultaneously, and means to withdraw and return the members to the ball in succession to tamp the cover pieces in place thereon.

17. A machine for covering tennis balls comprising a flexible applicator having a pocket in its face to hold a cover section, said pocket being of less area than the normal area of the cover section and means to flex the applicator to envelop a ball core and deposit the cover section thereon and then to withdraw and return the applicator member to the ball core to tamp the cover section in place.

18. A machine for covering tennis balls comprising a core support, flexible applicators on opposite sides of the core support, means on the face of each applicator to hold a cover piece, and means acting to advance the applicators toward the core and to flex them about the core to deposit the cover pieces thereon.

19. A machine for covering tennis balls comprising a core support, flexible applicators on opposite sides of the core support, means on the face of each applicator to hold a cover piece, and means acting to advance the applicators toward the core and to flex them about the core to deposit the cover pieces thereon, and then to withdraw and return the applicators to tamp the cover pieces in place.

20. In a machine for covering tennis balls, two complementary, sectional, jointed applicator members adapted to fit about a ball core, pockets in the faces of the applicators of less area than the normal area of the cover pieces, means to bring the applicators against a ball core to deposit the cover pieces thereon and to bend the applicator members after they contact the ball core.

21. A machine for covering balls comprising a ball support, applicators on opposite sides of the support, each applicator having means to hold a preformed planar blank of Cassinian outline, means to bring the core and the applicators in contact and means to withdraw the support when an applicator is in contact with the core.

WALTER E. HUMPHREY.